Patented Dec. 31, 1940

2,227,163

UNITED STATES PATENT OFFICE 2,227,163

AQUEOUS EMULSIONS OF POLYMERIZATION PRODUCTS AND A PROCESS OF PREPARING THEM

Werner Starck, Hofheim in Taunus, and Heinrich Freudenberger, Frankfort-on-the-Main-Neid, Germany, assignors, by mesne assignments, to General Aniline & Film Corporation, New York, N. Y., a corporation of Delaware No Drawing. Application November 13, 1935, Serial No. 49,642. In Germany November 20, 1934

12 Claims. (Cl. 260—32)

The present invention relates to aqueous emulsions of polymerization products and a process of preparing them.

Polymerizing unsaturated compounds in an emulsified form is known in the art. When applying this form of polymerization to certain compounds of little stability, such as vinyl esters, difficulties, however, arise, owing to the fact that these compounds are much more liable to decompose than other monomeric products, such as styrene, butadiene, vinyl chloride, acrylic acid esters and the like. Part of the difficulty of polymerizing compounds of this kind in the presence of water consists in the fact that the greater part of monomeric product is decomposed before the polymerization begins. The emulsions are thus produced in an inferior yield and are stable only to a small extent because the pH-value changes owing to further decomposition of the polymeric product. The course of the polymerization itself is likewise uncertain and the yield is unfavorable.

Now we have found that the polymerization of the compounds having the group $>C=CH_2$, especially of the monomeric vinyl compounds, for instance the organic esters and ethers, can be considerably improved by using homoeopolar, polymeric compounds of a considerable molecular size, i. e. such compounds as yield highly viscous solutions, owing to their molecular size, such as the so-called eucolloidal compounds, see for instance Hermann Staudinger "Die hochmolekularen organischen Verbindungen (Kautschuk und Cellulose)," Berlin 1932, page 19 and page 333. Particularly suitable are the neutral, water-soluble derivatives of synthetic polymerization products which owe their solubility in water merely to hydroxyl groups and not to free sulfo groups or carboxyl groups or sulfo groups and carboxyl groups bound in a salt-like manner. To this class of emulsifying agents belong above all the polyvinyl alcohol as well as the water-soluble derivatives thereof, such as partly saponified, water-soluble polyvinyl ester or polymerization products of a chemically similar construction and rich in hydroxyl groups, such as the products obtained by the hydroxy-ethylation of polymeric carboxylic acids. Besides the solubility in water, the homoeopolar character of the emulsifying agents is of importance.

It has further been found that not only the monomeric compounds which as such readily polymerize and cause difficulties only in the polymerization of the emulsions, do no longer show these drawbacks if the emulsifying agents in question are used, but also the monomeric compounds which by the hitherto known polymerization methods polymerize very slowly or yield only products of a low degree of polymerization, polymerize very readily so that highly viscous final products are obtained if the said agents are used. Thus, for instance, it is possible by using polyvinyl alcohol to transform monomeric compounds, such as vinyl ethers which as such form polymerization products of a relatively low degree of polymerization, into polymerization products of a normally high degree of polymerization which is peculiar to polymeric compounds, such as polyvinyl acetate, polyvinyl chloride or polystyrene. This industrially important effect could by no means be foreseen.

The polymerization may be carried out in such a manner that stable emulsions are obtained as final products; by using suitable conditions, however, the polymerization product may separate after or during the polymerization.

The hydrophilic groups contained in the emulsifying agent may subsequently be transformed into hydrophobic groups by acetalization, acylation, alkylation or similar reactions.

The following examples serve to illustrate the invention, but they are not intended to limit it thereto, the parts being by weight:

(1) 300 parts of an aqueous solution of 5 per cent. strength of polyvinyl alcohol of high molecular weight are emulsified, while vigorously stirring, together with 200 parts of vinyl acetate, in presence of 0.2 part of hydrogen peroxide of 30 per cent. strength and 0.6 part of formic acid. The emulsion is then heated to 70° C. As the polymerization proceeds the emulsion thickens and after the last monomeric portions have disappeared it assumes a creamy consistency. The product may be diluted with any desired quantity of water and is then suitable as a paint after pigments have been added. Suitable hydrophobic solvents and softening agents may also be introduced by stirring them into the emulsion. Emulsions of this kind may be used either alone or after the addition of suitable filling agents or pigments for adhesive purposes, impregnating tissues, laminating purposes and as lacquer coatings. By mixing the emulsions with soot, zinc oxide, fibrous materials or other filling materials there are obtained according to the addition made and after the evaporation of the emulsifying water, caoutchouc-like to solid products which may be rolled or shaped.

(2) 80 parts of an aqueous solution of 3 per cent. strength of hydroxyethylated polyvinyl alcohol are heated, while stirring, to 20° C. together with 20 parts of vinyl acetate and 0.5 part of hydrogen peroxide of 30 per cent. strength. A finely dispersed emulsion is obtained which after having been heated for 6 hours no longer contains any monomeric ester. The emulsion is particularly suitable for impregnating purposes.

(3) 200 parts of a solution of 5 per cent. strength of polyvinyl alcohol in water and 100 parts of vinyl methyl ketone are heated together for 6 hours to 70° C. with addition of 1 part of hydrogen peroxide of 30 per cent. strength. From the aqueous solution of the monomeric ketone which in the beginning is clear the polymeric compound of the ketone separates in the course of the operation in an emulsified form. The emulsion obtained is very stable.

(4) 150 parts of vinyl chloracetate and 350 parts of an aqueous solution of 5 per cent. strength of polyvinyl alcohol are polymerized together to form an emulsion by heating for one hour, while stirring, with addition of 1.5 parts of hydrogen peroxide of 30 per cent. strength. By salting or freezing out the polymeric chloracetate may be completely precipitated from the emulsion obtained. After filtering, washing with water and drying, there are obtained 140 parts of a powdery polyvinyl chloracetate of a pure white color possessing the known properties.

(5) An emulsion obtained by vigorously stirring 150 parts of vinyl butyrate and 350 parts of an aqueous solution of 10 per cent. strength of polyethylene oxide in water is subjected to polymerization by heating it for 6 hours to 80° C. after the addition of 1.5 parts of hydrogen peroxide of 30 per cent. strength. The polymeric vinyl butyrate remains emulsified in a finely divided form. The finished emulsion dries to a clear film.

(6) Into 140 parts of an aqueous solution of 3 per cent. strength of polyvinyl alcohol there are introduced in a reflux apparatus, while stirring, at 70° C., 60 parts of vinyl ethylether to which 0.6 part of hydrogen peroxide of 30 per cent. strength have been added. After heating for 6 hours the polymeric ether separates as a white crumbly mass from the reaction mixture. The product is soluble in alcohols, ketones and chlorinated hydrocarbons.

(7) In a pressure vessel 150 parts of monovinyl acetylene and 350 parts of an aqueous solution of 5 per cent. strength of polyvinyl alcohol are heated for 20 hours to 100° C., while stirring. The polymeric vinyl acetylene is obtained in a finely dispersed form. By salting out, it may be obtained as a fine powder from the emulsion; the powder is insoluble in all organic solvents.

(8) A solution of 7 parts of highly viscous polyvinyl alcohol and 0.6 part of hydrogen peroxide of 30 per cent. strength in 140 parts of water is intimately stirred with 60 parts of acrylic acid methyl ester, while heating the solution to 70° C. After 30 minutes the monomeric ester is polymerized in a finely dispersed form. After a paint made with this emulsion has dried a practically clear elastic film remains.

(9) A mixture of 200 parts of vinyl acetate and 50 parts of acrylic acid butyl ester is emulsified by means of a high-speed stirrer, in a solution of 12.5 parts of a highly viscous polyvinyl alcohol, 0.5 part of formic acid and 0.25 part of hydrogen peroxide of 30 per cent. strength. By heating the whole for 4 hours to 70° C. there is obtained a finely dispersed emulsion of the mixed polymerization product; the paints made therefrom yield elastic films; the emulsions are particularly suitable for making laminated sheets and impregnating textile materials.

We claim:

1. The process which comprises polymerizing an aqueous emulsion of vinyl acetate in the presence of polyvinyl alcohol.

2. The process which comprises polymerizing an aqueous emulsion of acrylic acid methyl ester in the presence of polyvinyl alcohol.

3. The process which comprises polymerizing an aqueous emulsion of vinyl acetate and acrylic acid butyl ester in the presence of polyvinyl alcohol.

4. Stable aqueous emulsions of polymerization products substantially identical with the products obtained by polymerizing an aqueous emulsion of vinyl acetate in the presence of polyvinyl alcohol.

5. Stable aqueous emulsions of polymerization products substantially identical with the product obtained by polymerizing an aqueous emulsion of acrylic acid methyl ester in the presence of polyvinyl alcohol.

6. Stable aqueous emulsions of polymerization products substantially identical with the products obtained by polymerizing an aqueous emulsion of vinyl acetate and acrylic acid butyl ester in the presence of polyvinyl alcohol.

7. The process which comprises polymerizing aqueous emulsions of vinyl compounds in the presence of polyvinyl alcohol.

8. Stable aqueous emulsions of polymerization products substantially identical with the products obtained by polymerizing aqueous emulsions of vinyl compounds in the presence of polyvinyl alcohol.

9. The process which comprises polymerizing aqueous emulsions of vinyl compounds in the presence of a water-soluble, high molecular polymerization compound selected from the group consisting of polyvinyl alcohol and its water-soluble derivatives.

10. The process which comprises polymerizing aqueous emulsions of vinyl compounds in the presence of a water-soluble, high molecular polymeric compound selected from the group consisting of polyvinyl alcohol and its water-soluble derivatives, and eliminating the water.

11. Stable aqueous emulsions of polymerization products substantially identical with the products obtained by polymerizing aqueous emulsions of vinyl compounds in the presence of a water-soluble, high molecular polymerization compound selected from the group consisting of polyvinyl alcohol and its water-soluble derivatives.

12. Polymerization of polymerizable substances in an aqueous emulsion by emulsifying vinyl acetate in water and polymerizing it, adding to the mixture as an emulsifying agent a water soluble partially saponified derivative of a saponifiable polymer of a compound containing a vinyl group.

WERNER STARCK.
HEINRICH FREUDENBERGER.